Patented June 4, 1940

2,203,295

UNITED STATES PATENT OFFICE 2,203,295

LECITHIN PRODUCT AND METHOD OF MAKING THE SAME

Richard Feibelmann, New York, N. Y., assignor to The Aktivin Corporation, New York, N. Y., a corporation of New York No Drawing. Application June 17, 1937, Serial No. 148,759. Renewed March 9, 1940

16 Claims. (Cl. 252—6)

The present invention has for its main object the preparation of a lecithin emulsion or a product from which such emulsion may be very easily and quickly formed. Such lecithin products may be useful in many industries, for instance in the textile industry, for modifying the surface and other characteristics of fibers of cotton, wool, rayon, silk or the like, or fabrics made therefrom, or the treatment of leather or analogous materials, or in the food industry, or in any case where the addition of lecithin may be useful.

The ordinary lecithin products of commerce cannot be used in acid solution, as they are destroyed or broken down by the action of acids. The application of ordinary non-water-soluble lecithin requires emulsification, but this is not a simple procedure, and requires the use of a homogenizing machine or a colloidal mill.

By means of my invention the lecithin may be so modified that it may be made into a paste in a very simple and economical manner, and without the use of any special apparatus or equipment, and such paste may be converted into an emulsion by the mere addition of water with suitable agitation.

I have discovered that by the treatment of lecithin with urea, a product results either as an emulsion or as a paste or gelatinous mass from which an emulsion may be very readily formed. For instance, the lecithin may be dissolved in a suitable solvent and urea is added to this solution to form a clear gelatinous material which is very easily emulsified in water. The emulsion is a stable, light colored milk-like product which does not separate or settle upon long standing. Instead of dissolving the lecithin, it may be melted and mixed with a water solution of urea, or the urea and water may be mixed or stirred separately into the lecithin. The resulting product is comparatively stable in weak acid baths, for instance acetic or formic acid, and thus the lecithin may be used in weak acid textile or other processes under conditions where ordinary lecithin cannot be used.

The following are examples of the way in which the product may be made:

*Example 1.*—1 pound of soya lecithin is dissolved in 1 pound of neutral sulfonated castor oil (50% water) and ½ pound of urea is added. Upon stirring, the desired homogeneous gelatinous mass results. Instead of sulfonated castor oil other solvents may be used. Corn syrup is also very suitable.

*Example 2.*—4 pounds of soya lecithin are melted and a hot solution of 3 pounds of urea and 3 pounds of water is added. Upon stirring, the desired gelatinous mass results.

*Example 3.*—2 pounds of soya lecithin are melted and 1 pound of dry urea is added and stirred in. A yellowish product results which readily takes up water to form the desired gelatinous mass.

The gelatinous or paste like lecithin product is homogeneous, and if there be only a relatively small amount of water present it is transparent. This product may be diluted to any degree desired, but the addition of water converts the gelatinous mass into a turbid emulsion in which the lecithin product is not in solution. Preferably the dilution is accomplished by the addition of the water in small successive portions with stirring, rather than by adding the gelatinous mass to a large volume of water. For instance, 1 pound of the product may be mixed with ¼ pound of water, then another ¼ pound of water is added and mixed by stirring, and further water is added to make the emulsion as dilute as may be desired for the particular purpose in which the lecithin is to be used.

In the first and third of the examples above given, the lecithin and urea are in the ratio of 2 to 1 by weight. In the second example they are in the ratio of 2 to 1½ by weight. These proportions may be modified widely according to the requirements of the particular application, but as the purpose is to obtain eventually a lecithin emulsion, the minimum amount of urea should be used which will accomplish that desired object. If the amount of urea be increased to the proportion of 5 parts of urea to 2 parts of lecithin in the examples given, the product, although of a pasty nature, is very grainy instead of smooth and homogeneous, due to the undissolved or unreacted urea present as crystals.

If the proportion of urea be increased to 10 parts for 2 of lecithin, the mass is not a paste, but a mushy crystalline mass, due to said excess of urea. In any of such proportions, or even with a higher urea content, the mass may be diluted with water to form a lecithin emulsion, but the larger the proportion of urea the lower will be the lecithin concentration with a given amount of water, and the excess of urea performs no useful function in a lecithin emulsion used for instance in the textile industry. Experiments indicate that the urea present should be at least 25% of the lecithin.

In Example 1 I have mentioned sulfonated castor oil, but other analogous solvents for lecithin may be employed, such for instance as sulfonated olive oil. In most cases it is preferable to use a liquid which is a solvent for both lecithin and urea, but in some cases a liquid may be used which is a solvent for only one of them.

Although I prefer to use urea $(NH_2)_2CO$, because of its low cost, I may employ derivatives of urea, such as alkyl urea, urethane, thiourea and the like.

Although I prefer to employ the lecithin as obtained from the soya bean, I may employ other forms of lecithin or any analogous and suitable phosphatide.

I am not advised as to whether the urea and the lecithin form a definite chemical substance, or whether the new products, namely the gelatinous or paste like mass and the emulsion, are merely physical combinations or mixtures of the ingredients. Therefore the terms lecithin product and phosphatide product are used to include either such chemical combination as may be formed, or the mixture, if no such chemical union takes place.

Having thus described my invention, what I claim as new and desire to secure by Letters Patent is:

1. A composition of matter containing lecithin, urea, and a liquid, which is a solvent for lecithin and which will not interfere with the formation of an aqueous emulsion the proportion of liquid being sufficient to give the composition paste form, and the proportion of urea being sufficient to hold the lecithin in suspension as an emulsion when an excess of water is added.

2. A composition of matter containing lecithin, urea, and a liquid, which is a solvent for lecithin and which will not interfere with the formation of an aqueous emulsion the proportion of liquid being sufficient to give the composition paste form, and the proportion of urea being sufficient to hold the lecithin in suspension as an emulsion when an excess of water is added but insufficient to form any considerable amount of free crystals in the paste.

3. A composition of matter containing urea and lecithin in the proportions of one to one and one-half parts of urea to two parts of lecithin.

4. A composition of matter containing urea and lecithin in the proportions of one to one and one-half parts of urea to two parts of lecithin and a solvent for one of them, which solvent will not interfere with the formation of an aqueous emulsion.

5. A composition of matter containing urea and lecithin in the proportions of one to one and one-half parts of urea to two parts of lécithin and a solvent for one of them, in sufficient quantity to give the composition a paste-like consistency, which solvent will not interfere with the formation of an aqueous emulsion.

6. A homogeneous paste composed of a phosphatide, a compound selected from the group consisting of urea, alkyl urea, urethane, and thiourea, and a liquid which is a solvent for one of them (the phosphatide or the compound), and which will not interfere with the formation of an aqueous emulsion, the proportion of liquid being such as to impart the pasty consistency and the proportion of said compound being such as to hold the phosphatide in suspension upon diluting with water.

7. A stable, turbid, aqueous lecithin emulsion containing only approximately enough urea to hold the lecithin in suspension.

8. A stable, turbid, aqueous lecithin emulsion containing sufficient urea to hold the lecithin in suspension but not to exceed the dry weight of the lecithin.

9. The process which consists of mixing urea, lecithin, and a solvent for one of them in such proportions as to form a homogeneous paste relatively free from urea in crystalline form, the proportions of lecithin and urea being such that the paste is convertible into a stable lecithin emulsion upon diluting with water, and the solvent being one which will not interfere with the formation of an aqueous emulsion.

10. The process which consists of mixing urea, lecithin, and a liquid selected from the group consisting of water, sulfonated castor oil and corn syrup, said liquid being in such proportions as to form a homogeneous paste, the amount of urea being insufficient to form any substantial quantity of free crystals in the paste and sufficient to hold the lecithin in suspension as a turbid emulsion upon diluting with water.

11. The process of preparing a paste for use in making a lecithin emulsion, which includes mixing 2 parts of lecithin with not to exceed an approximately equal weight of urea, and such an amount of liquid as will give the product the consistency of paste, said liquid being a solvent for lecithin and miscible with water.

12. The process of making a paste which may be diluted with water to form a lecithin emulsion, which includes dissolving lecithin in an approximately equal weight of neutral sulfonated castor oil having 50% water, and adding an amount of urea less than the amount of the lecithin but sufficient to hold the lecithin in suspension as an emulsion when an excess of water is added.

13. The process of making a paste which may be diluted with water to form a lecithin emulsion, which includes dissolving urea in an approximately equal weight of water and adding a slightly greater weight of melted lecithin.

14. The process of making a paste which may be diluted with water to form a lecithin emulsion, which includes dissolving urea in water and adding melted lecithin, the amount of lecithin being in excess of the amount of urea, and the amount of urea being sufficient to hold the lecithin in suspension as an emulsion when an excess of water is added.

15. The process of making a gelatinous mass which may be diluted with water to form a lecithin emulsion, which includes melting lecithin and adding approximately one-half its weight of dry urea.

16. The process of making a gelatinous mass which may be diluted with water to form a lecithin emulsion, which includes melting lecithin and adding dry urea thereto, the amount of urea being less than the amount of lecithin but sufficient to hold the lecithin in suspension as an emulsion when an excess of water is added.

RICHARD FEIBELMANN.